(12) United States Patent
Kim et al.

(10) Patent No.: US 8,054,816 B2
(45) Date of Patent: Nov. 8, 2011

(54) METHOD FOR HOPPING FREQUENCY OF ORTHOGONAL-FREQUENCY-DIVISION-MULTIPLEXING SYMBOL

(75) Inventors: Hae-sik Kim, Yongin-si (KR); Jae-ho Roh, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1364 days.

(21) Appl. No.: 11/637,766

(22) Filed: Dec. 13, 2006

(65) Prior Publication Data

US 2007/0147228 A1    Jun. 28, 2007

(30) Foreign Application Priority Data

Dec. 23, 2005  (KR) .................. 10-2005-0128943

(51) Int. Cl.
*H04B 7/212* (2006.01)
(52) U.S. Cl. ................................. 370/343; 370/480
(58) Field of Classification Search ............... 370/343, 370/476, 480
See application file for complete search history.

(56) References Cited

U.S. PATENT DOCUMENTS

| | | | | |
|---|---|---|---|---|
| 2004/0151109 A1* | 8/2004 | Batra et al. | ............... | 370/208 |
| 2004/0166886 A1* | 8/2004 | Laroia et al. | ............... | 455/522 |
| 2004/0228269 A1* | 11/2004 | Balakrishnan et al. | ....... | 370/208 |
| 2005/0025080 A1* | 2/2005 | Liu | ............... | 370/311 |
| 2005/0147024 A1 | 7/2005 | Jung et al. | | |
| 2007/0070944 A1* | 3/2007 | Rinne et al. | ............... | 370/329 |

FOREIGN PATENT DOCUMENTS

| | | |
|---|---|---|
| JP | 2002-111631 A | 4/2002 |
| KR | 10-2005-0050025 A | 5/2005 |
| WO | 2004038972 A1 | 5/2004 |
| WO | 2005/050863 A1 | 6/2005 |

OTHER PUBLICATIONS

Wu, J., "Overview of MB-OFDM UWB Baseband System", Internet <URL, http://my.com.nthu.edu.tw/~jmwu/LAB/Overview_MB-OFDM-UWB-TxRx.pdf>, Jul. 19, 2005, pp. 1-50.
Communication dated Mar. 22, 2011, issued by the Korean Intellectual Property Office in counterpart Korean patent application No. Oct. 2005-0128943.

* cited by examiner

*Primary Examiner* — Kevin C Harper
(74) *Attorney, Agent, or Firm* — Sughrue Mion, PLLC

(57) ABSTRACT

Provided is a method for hopping frequencies of an OFDM (orthogonal-frequency-division-multiplexing) symbol, including: receiving an OFDM symbol comprising mapping information as to a type of disposing sub-carriers of the OFDM symbol, a frequency hopping pattern, and positions of pilots; and mapping the type, the frequency hopping pattern, and the positions of the pilots based on the mapping information.

18 Claims, 9 Drawing Sheets

METHOD FOR HOPPING FREQUENCY OF ORTHOGONAL-FREQUENCY-DIVISION-MULTIPLEXING SYMBOL

CROSS-REFERENCE TO RELATED APPLICATIONS

This application claims priority under 35 U.S.C. §119 from Korean Patent Application No. 10-2005-0128943 filed on Dec. 23, 2005, in the Korean Intellectual Property Office, the disclosure of which is incorporated herein by reference in its entirety.

BACKGROUND OF THE INVENTION

1. Field of the Invention

Methods consistent with the present invention relate to hopping frequencies of an orthogonal-frequency-division-multiplexing (OFDM) symbol, and more particularly, to mapping a method of grouping sub-carriers and setting of positions of pilots with reference to reserved bits in a physical (PHY) layer header before transmitting data using an OFDM modulation method so as to hop frequencies of an OFDM symbol.

2. Description of the Related Art

In general, an OFDM system transforms symbols input in series into parallel symbols having predetermined sizes, multiplex the parallel symbols into orthogonal sub-carrier frequencies, and transmit the parallel symbols over the orthogonal sub-carrier frequencies.

A multi-band (MB)-OFDM method is characterized in that a plurality of frequency bands of an OFDM symbol is hopped in a unit of a symbol to transmit a signal. For example, the MB-OFDM method is modulation technology used in a specific wireless communication system such as an ultra wide band (UWB) system. OFDM modulation technology and frequency hopping technology are combined into MB-OFDM modulation technology.

An MB-OFDM system divides a predetermined frequency band into a plurality of sub-bands. The MB-OFDM system can transmit data (a symbol) using the plurality of sub-bands so as to transmit or receive a large amount of data per unit time. A UWB system selects one of the plurality of sub-bands and uses the selected sub-band according to set regulations so as to improve security of data.

Figure 1A:
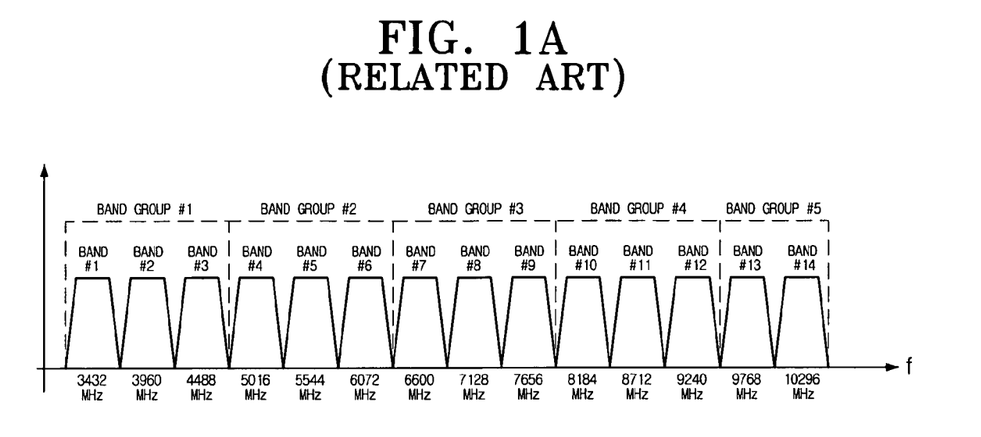
FIG. 1A is a view illustrating a plurality of sub-bands to be used in a related art MB-OFDM system.

FIG. 1A is a view illustrating a plurality of sub-bands to be used in an MB-OFDM system. As shown in FIG. 1A, a center frequency of a frequency band of the MB-OFDM system ranges from 3432 MHz to 10296 MHz. The frequency band of the MB-OFDM system is broadly divided into five groups. Each of first through fourth groups of the five groups includes three sub-bands, and a fifth group includes two sub-bands.

Center frequencies of the three sub-bands of the first group are 3432 MHz, 3960 MHz, and 4488 MHz, respectively, and center frequencies of the three sub-bands of the second group are 5016 MHz, 5544 MHz, and 6072 MHz, respectively. Center frequencies of the three sub-bands of the third group are 6600 MHz, 7128 MHz, and 7656 MHz, respectively, and center frequencies of the three sub-bands of the fourth group are 8184 MHz, 8712 MHz, and 9240 MHz, respectively. Center frequencies of the two sub-bands of the fifth group are 9768 MHz and 10296 MHz, respectively.

Table 1 below shows a method of transmitting payloads according to a transmission rate in the MB-OFDM system.

TABLE 1

| Transmission Rate | Modulation Method | Encoding Rate | Conjugate | TSF | Spreading Gain |
|---|---|---|---|---|---|
| 53.3 | QPSK | 1/3 | o | 2 | 4 |
| 80 | QPSK | 1/2 | o | 2 | 4 |
| 106.67 | QPSK | 1/3 | x | 2 | 2 |
| 160 | QPSK | 1/2 | x | 2 | 2 |
| 200 | QPSK | 5/8 | x | 2 | 2 |
| 320 | DCM | 1/2 | x | 1 | 1 |
| 400 | DCM | 5/8 | x | 1 | 1 |
| 480 | DCM | 3/4 | x | 1 | 1 |

In a case where the transmission rate ranges from 53.3 Mbps to 200 Mbps, the MB-OFDM system uses a quadrature phase shift keying (QPSK) method. In a case where the transmission rate ranges from 320 Mbps to 480 Mbps, the MB-OFDM system uses a dual carrier modulation (DCM) method.

In a case where the transmission rate ranges from 53.3 Mbps to 80 Mbps, the MB-OFDM system transmits a conjugate symbol. Thus, the spreading gain is "4." In other words, in a case where the transmission rate ranges from 53.3 Mbps to 80 Mbps, a time spreading factor (TSF) is "2." Thus, one symbol is transmitted four times, including a conjugate symbol.

Table 2 below shows an example of transmitting a symbol in an MB-OFDM system having a transmission rate ranging from 53.3 Mbps to 80 Mbps.

TABLE 2

| Data | Mapping Data |
|---|---|
| D0 | C0 |
| D1 | C1 |
| ... | ... |
| D49 | C49 |
| D49* | C50 |
| ... | ... |
| D1* | C98 |
| D0* | C99 |

Referring to Table 2, one data is transmitted two times, including a conjugate data. In other words, a transmitter transmits data D0 through D49 together with conjugate data D0* through D49*. In general, if the QPSK method is used, the transmitter divides one data into real and imaginary components and transmits the real and imaginary components.

The MB-OFDM system operating as described above is used in a method of modulating a UWB signal for fast short-distance communications. Federal Communications Commission (FCC) limits power emission for UWB communications to −41.3 dBm/MHz and limits levels to reduce interference among different frequency bands. According to IEEE 802.15.3a, power consumption is required to be 110 mW or less at a transmission rate of 110 Mbps, and 250 mW or less at a transmission rate of 200 Mbps.

Thus, an OFDM symbol must be transmitted at low power to use an MB-OFDM modulation method for UWB communications. Thus, technology for lowering a transmission power of an OFDM symbol is required. Also, low power UWB technology is required to apply UWB technology to mobile devices.

SUMMARY OF THE INVENTION

Illustrative, non-limiting embodiments of the present invention overcome the above disadvantages and/or other disadvantages not described above. Also, the present invention is not required to overcome the disadvantages described above, and an illustrative, non-limiting embodiment of the present invention may not overcome any of the problems described above.

Accordingly, an aspect of the present general inventive concept is to provide a method for mapping a type of disposing sub-carriers and setting positions of pilots with reference to reserved bits in a PHY layer header before transmitting data using an OFDM modulation method so as to hop frequencies of an OFDM symbol.

According to an aspect of the present invention, there is provided a method for hopping frequencies of an OFDM symbol, which includes receiving an OFDM symbol comprising mapping information about a type of disposing sub-carriers of the OFDM symbol, a pattern of hopping frequencies of the OFDM symbol, and locations of pilots; and mapping the type of disposing the sub-carriers, the pattern of hopping the frequencies, and the locations of the pilots based on the mapping information.

The mapping information is set in reserved bits of a physical layer header of the OFDM symbol.

The sub-carriers are grouped into block form in the OFDM symbol or distributed in the OFDM symbol.

The sub-carriers are grouped through combining a minimum of one sub-carrier to a maximum of the total number of the sub-carriers of the OFDM symbol.

The grouping of the sub-carriers comprises overlapping the sub-carriers.

The sub-carriers are distributed at the same interval or at different intervals, if the sub-carriers are distributed in the OFDM symbol.

The pilots are moved to positions of sub-carriers in which a next OFDM symbol is to be transmitted, regardless of the type of disposing the sub-carriers either grouped or distributed.

The pilots are fixed in distributed form or grouped form.

The pilots are disposed at positions with reference to positions of the sub-carrier according to a request from a receiver of the OFDM symbol.

The pattern of the hopping the frequencies of the OFDM symbol is provided such that the sub-carriers have fixed frequencies in the OFDM symbol, or the frequencies of the sub-carriers are hopped, regardless of the type of disposing the sub-carriers which are either grouped or distributed.

The number of generated frequency hopping patterns is "$n^{n-1}$", when the sub-carriers are grouped to an identical size without overlapping with one another and when the number of grouped sub-carriers is "n".

The hopping the frequencies is performed in consideration of a symmetric characteristic when the sub-carriers are in frequency domain spreading.

The number of generated frequency hopping patterns is "$m^{m-1}$", when the sub-carriers overlap with one another, or are grouped to different sizes, and the number of grouped sub-carriers is "m".

The hopping the frequencies is maintained either at the same interval, or at different intervals.

Overlapping the sub-carriers is performed or is not performed when the frequency hopping is at the same interval or at the different intervals.

BRIEF DESCRIPTION OF THE DRAWINGS

These and/or other aspects of exemplary embodiments of the present invention will become apparent and more readily appreciated from the following description of the exemplary embodiments, taken in conjunction with the accompanying drawings, in which.

DETAILED DESCRIPTION OF THE EXEMPLARY EMBODIMENTS

Certain exemplary embodiments of the present invention will be described in greater detail with reference to the accompanying drawings.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 2A:
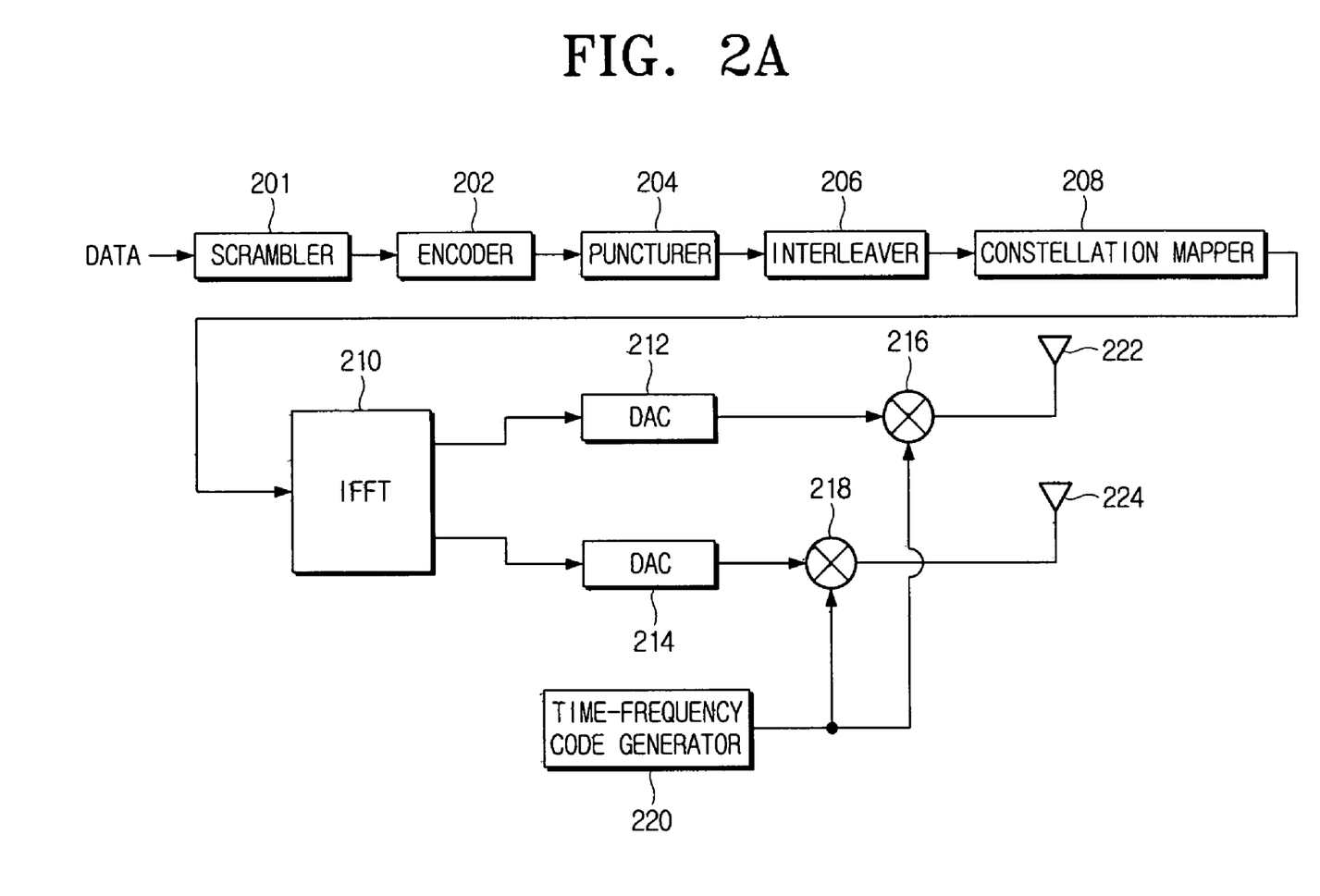
FIG. 2A is a schematic block diagram of an internal structure of an MB-OFDM transmitter adopting a method for hopping frequencies of an OFDM symbol according to an exemplary embodiment of the present invention.

FIG. 2A is a schematic block diagram of an internal structure of an MB-OFDM transmitter adopting a method for hopping frequencies of an OFDM symbol according to an exemplary embodiment of the present invention. Referring to FIG. 2A, the MB-OFDM transmitter includes a scrambler 201, an encoder 202, a puncturer 204, an interleaver 206, a constellation mapper 208, an inverse fast fourier transformer (IFFT) 210, digital-to-analog converters (DACs) 212 and 214, multipliers 216 and 218, a time-frequency code generator 220, and antennas 222 and 224.

The scrambler 201 receives data to be transmitted. The MB-OFDM transmitter stores contents as shown in Table 2. Thus, the MB-OFDM transmitter transmits mapping data corresponding to the data to be transmitted to the scrambler 201. An MB-OFDM receiver also stores the contents as shown in Table 2.

The scrambler 201 scrambles the received data and transmits the scrambled data to the encoder 202. The encoder 202 encodes the scrambled data. The encoder 202 encodes the scrambled data using a convolution code, a Reed-Solomon code, low density parity check (LDPC) code, a turbo code, or the like. An encoding rate of the encoder 202 is as described in Table 1.

The puncturer 204 receives an encoded symbol from the encoder 202 and punctures the encoded symbol. The MB-OFDM transmitter can reduce a number of bits of a transmitted symbol due to this puncturing process.

The interleaver 206 interleaves bits of the symbol received from the puncturer 204. The MB-OFDM receiver can recover an error occurring in a wireless channel due to this interleaving process. In other words, the MB-OFDM transmitter performs interleaving, and thus the MB-OFDM system can prevent a block error from occurring.

The constellation mapper 208 modulates the symbol according to a modulation method corresponding to each transmission rate. In other words, the constellation mapper 208 performs a modulation using a constellation corresponding to each modulation method. The constellation mapper 208 inserts pilots into the received symbol and adds a cyclic prefix (CP) and a guard interval to the received symbol (GI). The GI is inserted between consecutive blocks to prevent inter-symbol interference, and the CP is inserted to solve a problem of received inter-symbols being delayed and thus not orthogonal.

The constellation mapper 208 according to an exemplary embodiment of the present invention sets a method of grouping sub-carriers and positions of pilots with reference to reserved bits in a header of the received symbol. For example, the constellation mapper 208 distributes the sub-carriers or collects the sub-carriers in block form and fixes the positions of the pilots within the grouped sub-carriers or moves the positions of the pilots with respect to each sub-carrier.

The IFFT 210 performs IFFT on the received symbol.

The DAC 212 transforms a digital signal corresponding to a received real component into an analog signal, and the DAC 214 transforms a digital signal corresponding to a received imaginary component to an analog signal. The time-frequency code generator 220 generates a time-frequency code so as to obtain time and frequency diversity effects.

The time-frequency code is transmitted to the multipliers 216 and 218. The multiplier 216 multiplies the received analog signal by the time-frequency code and transmits the multiplication result to the antenna 222. The multiplier 218 multiplies the received analog signal by the time-frequency code and transmits the multiplication result to the antenna 224.

The antenna 222 transmits the signal received from the multiplier 216 to the MB-OFDM receiver using a wireless channel, and the antenna 224 transmits the signal received from the multiplier 218 to the MB-OFDM receiver using a wireless channel. The MB-OFDM receiver has an inverse structure to the MB-OFDM transmitter, and thus the structure of the MB-OFDM receiver will not be described herein.

A packet structure of a physical layer convergence procedure (PLCP) header transmitted and/or received according to an MB-OFDM method includes a physical (PHY) header (40 bits), tail bits (6 bits), a scramble medium access control (MAC) header/header check sequence (HCS) (96 bits), tail bits (6 bits), Reed-Solomon parity bytes (48 bits), tail bits (4 bits), and the like.

The PHY header includes transmission rate information for indicating a transmission rate of an MAC frame necessary for recovering a signal in a PHY layer and length information for indicating lengths of payloads. The PHY header also includes scrambler information, burst mode preamble information, transmission TFC information, band group information, and reserved bits information.

According to an exemplary embodiment of the present invention, reserved bits in a PHY header are used to indicate information as to a method of grouping sub-carriers, frequency hopping patterns, and positions of pilots.

Figure 2B:
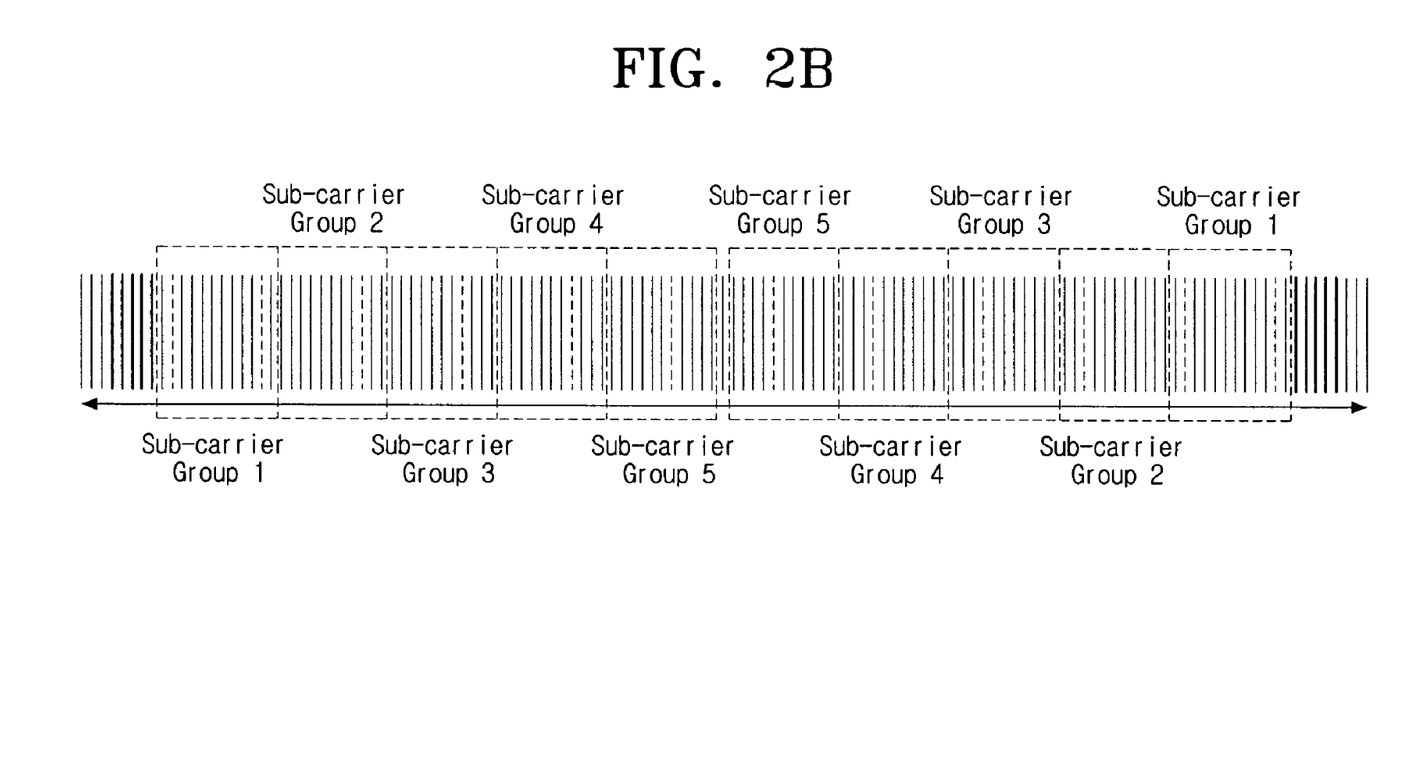
FIG. 2B is a view illustrating grouping of sub-carriers in a method for hopping frequencies of an OFDM symbol according to an exemplary embodiment of the present invention.

FIG. 2B is a view illustrating grouping of sub-carriers in a method for hopping frequencies of an OFDM symbol according to an exemplary embodiment of the present invention. In FIG. 2B, thick vertical full lines denote distributed sub-carriers, thin vertical full lines denote grouped sub-carriers, and vertical dashed lines denote pilots.

If the MB-OFDM transmitter according to an exemplary embodiment of the present invention receives an OFDM symbol including reserved bits indicating a method of grouping sub-carriers, frequency hopping patterns, and positions of pilots, the constellation mapper 208 groups sub-carriers with reference to the reserved bits.

In the exemplary embodiment of the present invention, the sub-carriers of the OFDM symbol are grouped in block form for low power transmission, i.e., grouped into five sub-carrier groups that are symmetric as shown in FIG. 2B.

When the sub-carriers are grouped, each of the sub-carriers of the OFDM symbol is determined to be an element so as to group the sub-carriers through possible combinations. For example, if the OFDM symbol includes 128 sub-carriers, the 128 sub-carriers may be grouped through combining of a minimum of one element to a maximum of 128 elements, and overlap with one another.

The sub-carriers of the OFDM symbol may be distributed to be grouped. Here, the sub-carriers may be distributed at the same interval or different intervals.

The MB-OFDM transmitter according to an exemplary embodiment of the present invention maps the grouping of the sub-carriers, the frequency hopping patterns, and the positions of the pilots with reference to the reserved bits.

In the case of the frequency hopping patterns according to an exemplary embodiment of the present invention, the MB-OFDM transmitter has a pattern in which the sub-carriers of the OFDM symbol are disposed at fixed frequencies or with a pattern for hopping frequencies regardless of whether the sub-carriers are grouped or distributed.

If sub-carriers are grouped in the same size without overlapping with one another and the number of the grouped sub-carriers is "n" during hopping of frequencies, $n^{n-1}$ frequency hopping patterns are generated. Here, if the sub-carriers are used for frequency domain spreading, the constellation mapper 208 hops the frequencies in consideration of a symmetric characteristic.

If the sub-carriers overlap with one another or are grouped in different sizes and the number of grouped sub-carriers is "m" during the hopping of the frequencies, $m^{m-1}$ frequency hopping patterns are generated.

Here, the frequency hopping, performed when the sub-carriers are distributed in the OFDM symbol, may be frequency hopping for maintaining the same interval or frequency hopping for maintaining different intervals. Also, overlapping may be performed or not performed regardless of whether the frequency hopping is performed at the same interval or different intervals.

The pilots may be disposed at positions of sub-carriers in which a next OFDM symbol is to be transmitted, regardless of the disposition of the grouped sub-carriers or the distributed sub-carriers.

In a case where positions of the pilots are fixed in the OFDM symbol, the pilots may be fixed in distributed form or in grouped form.

The pilots may be disposed at positions of desired sub-carriers in the OFDM symbol according to a request of the MB-OFDM receiver.

Figure 3:
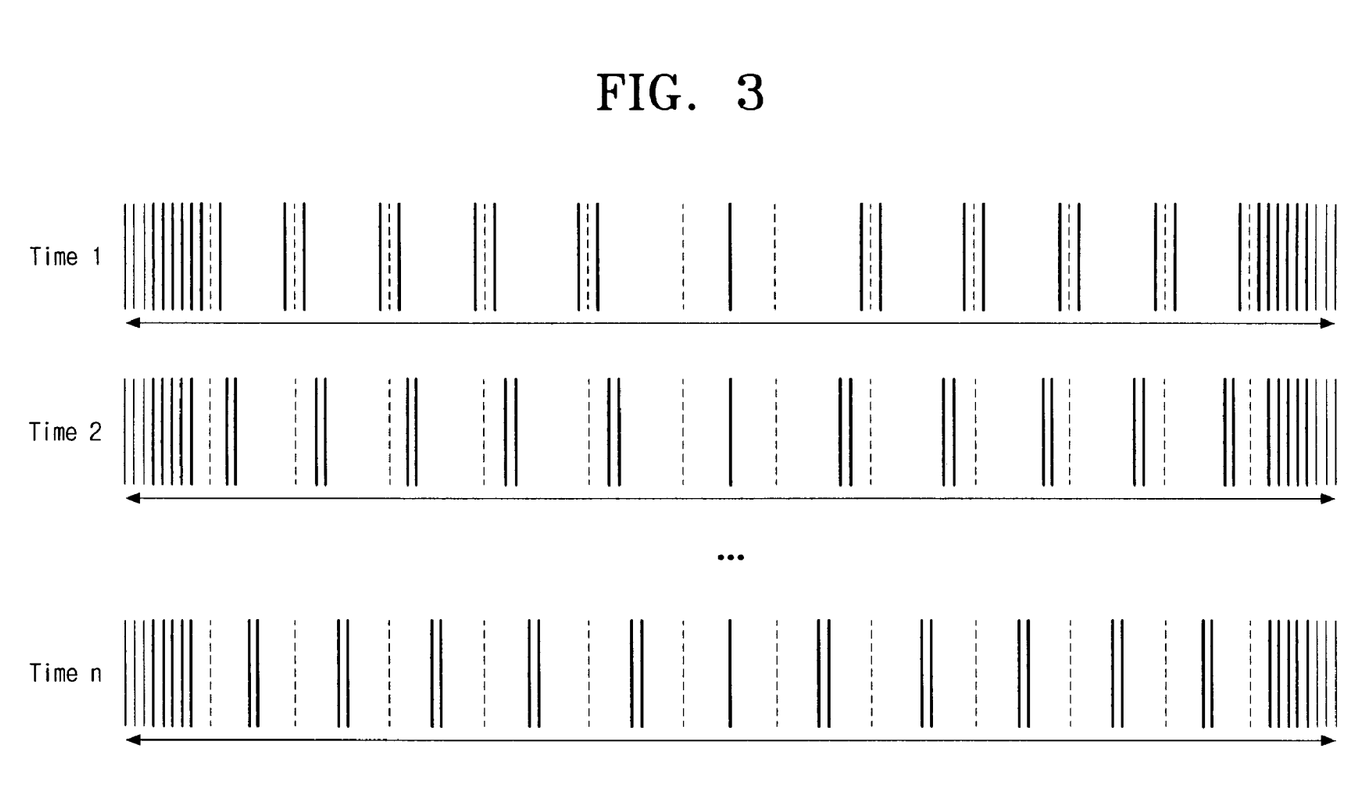
FIG. 3 is a view illustrating an OFDM symbol mapped as distributed sub-carriers and fixed pilots in a method for hopping frequencies of the OFDM symbol according to another exemplary embodiment of the present invention.

FIG. 3 is a view illustrating an OFDM symbol mapped with distributed sub-carriers and fixed pilots in a method for hopping frequencies of the OFDM symbol according to another exemplary embodiment of the present invention.

Figure 4:
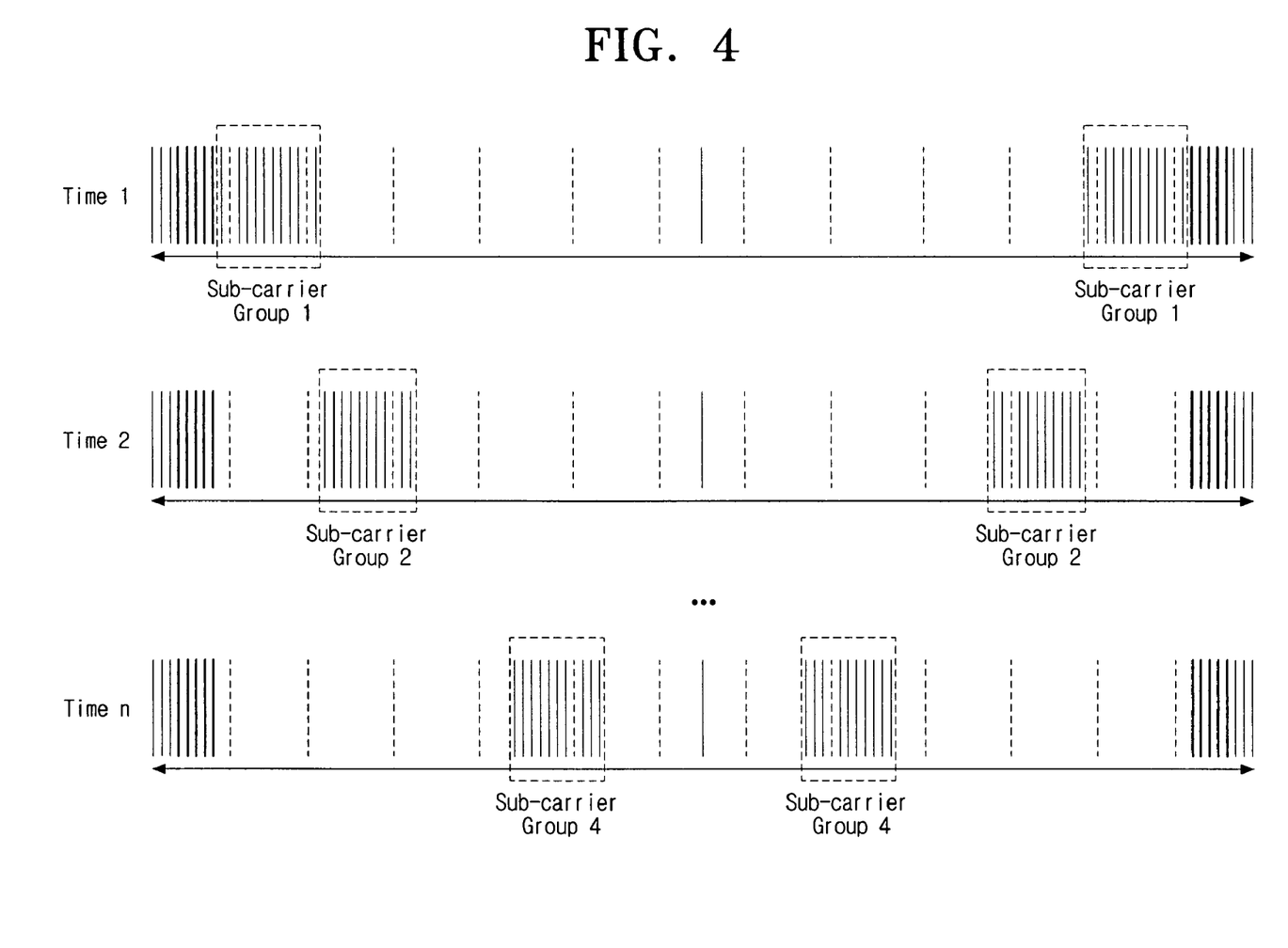
FIG. 4 is a view illustrating an OFDM symbol mapped as sub-carriers grouped in a block form and fixed pilots in a method for hopping frequencies of the OFDM symbol according to still another exemplary embodiment of the present invention.
Figure 5:
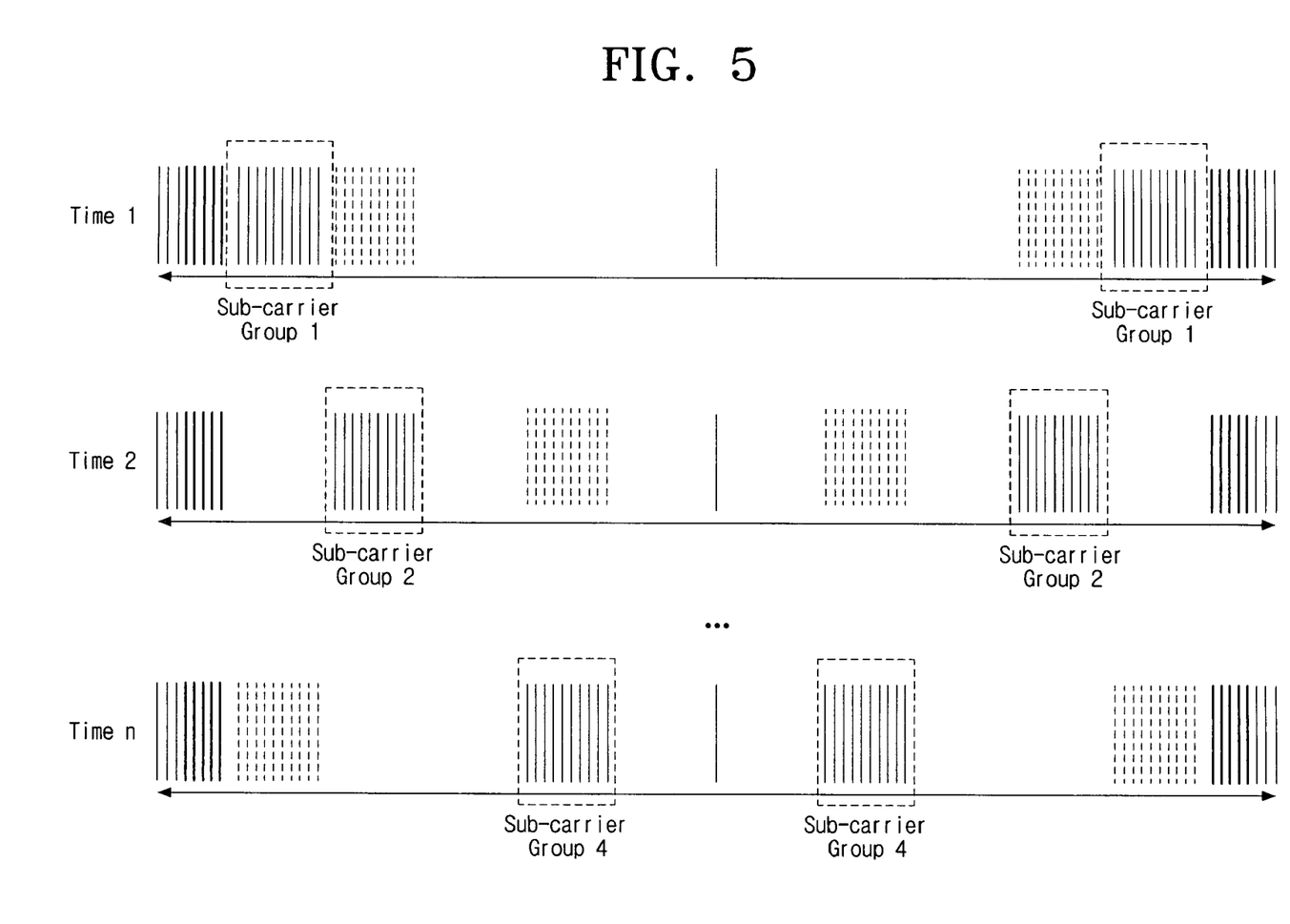
FIG. 5 is a view illustrating an OFDM symbol mapped as sub-carriers grouped in a block form and moved pilots in a method for hopping frequencies of the OFDM symbol according to still another exemplary embodiment of the present invention.

Referring to FIGS. 3 through 5, thick vertical full lines denote distributed sub-carriers, thin vertical full lines denote grouped sub-carriers, and vertical dashed lines denote pilots.

If sub-carriers are grouped according to a distributed method, frequencies are hopped, and positions of pilots are fixed with reference to the reserved bits, the constellation mapper 280 of the MB-OFDM transmitter according to this exemplary embodiment of the present invention performs mapping so as to distribute the sub-carriers at the same interval, hop frequencies of the sub-carriers at each time, and dispose the pilots in fixed positions at each time as shown in FIG. 3 when time changes from Time 1 to Time n through Time 2.

Figure 1B:
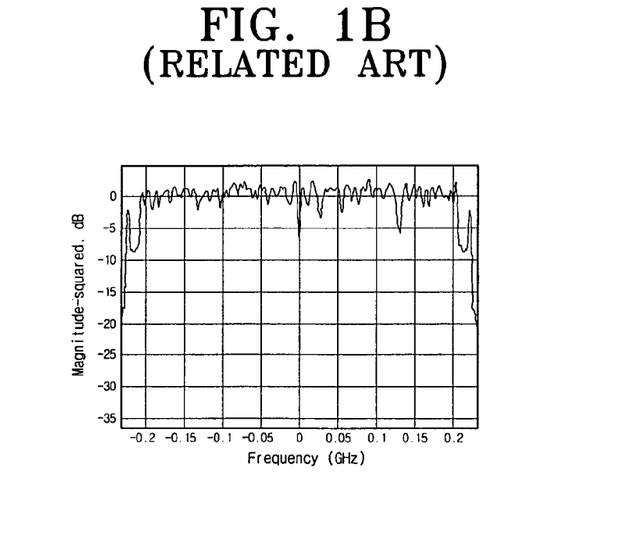
FIG. 1B illustrates a graph of frequency spectrums and power consumption for a related art OFDM symbol.
Figure 6:
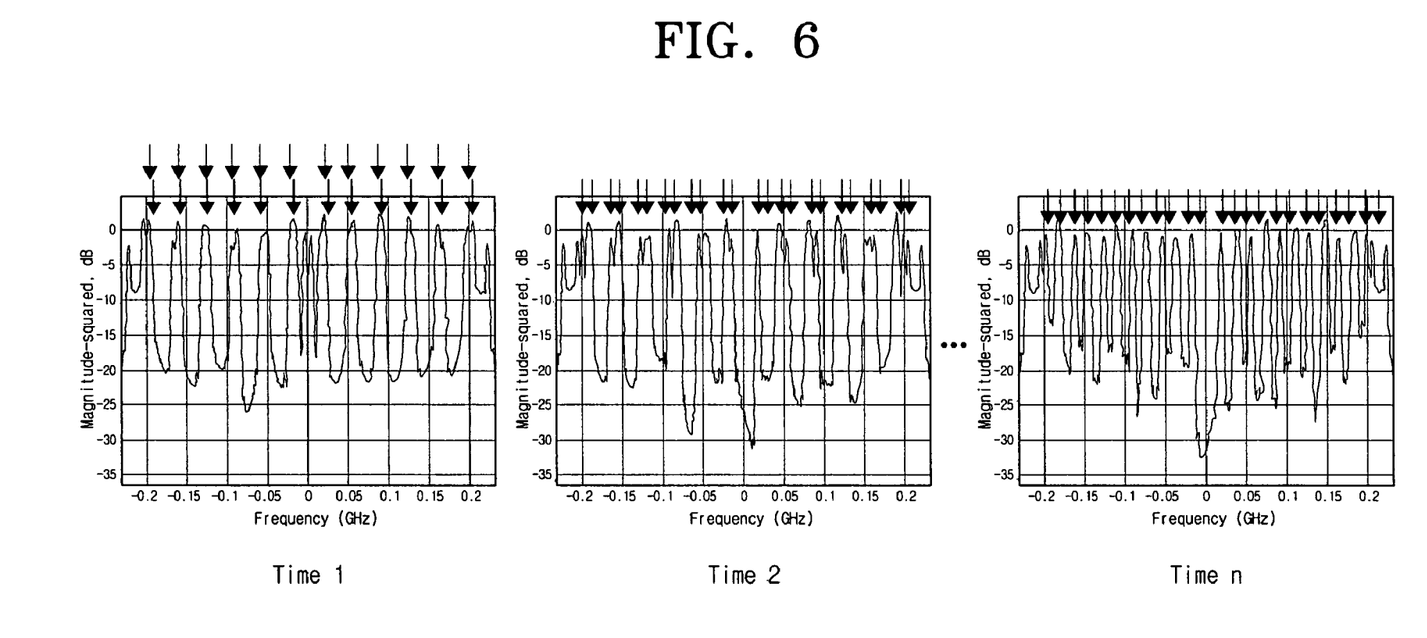
FIG. 6 illustrates a graph of frequency spectrums and power consumption for an OFDM symbol according to an exemplary embodiment of the present invention.

With reference to frequency spectrums of an OFDM symbol of FIG. 6 mapped as in this exemplary embodiment of the present invention, power is consumed only for fixed pilots and distributed, grouped sub-carriers in Time 1, Time 2, and Time n. Thus, in a case where sub-carriers are grouped according to a distributed method, power consumption for the OFDM symbol can be more reduced than continuous power consumption for a related art OFDM symbol as shown in FIG. 1B.

FIG. 4 is a view illustrating an OFDM symbol mapped as sub-carriers grouped in block form and fixed pilots in a method for hopping frequencies of the OFDM symbol according to still another exemplary embodiment of the present invention.

In this exemplary embodiment of the present invention, a first sub-carrier group grouped in block form is transmitted in Time 1, a second sub-carrier group having hopped frequencies is transmitted in Time 2, and a fourth sub-carrier group having hopped frequencies is transmitted in Time n. Here, pilots of each sub-carrier group are in fixed positions, i.e., in the same positions.

Figure 7:
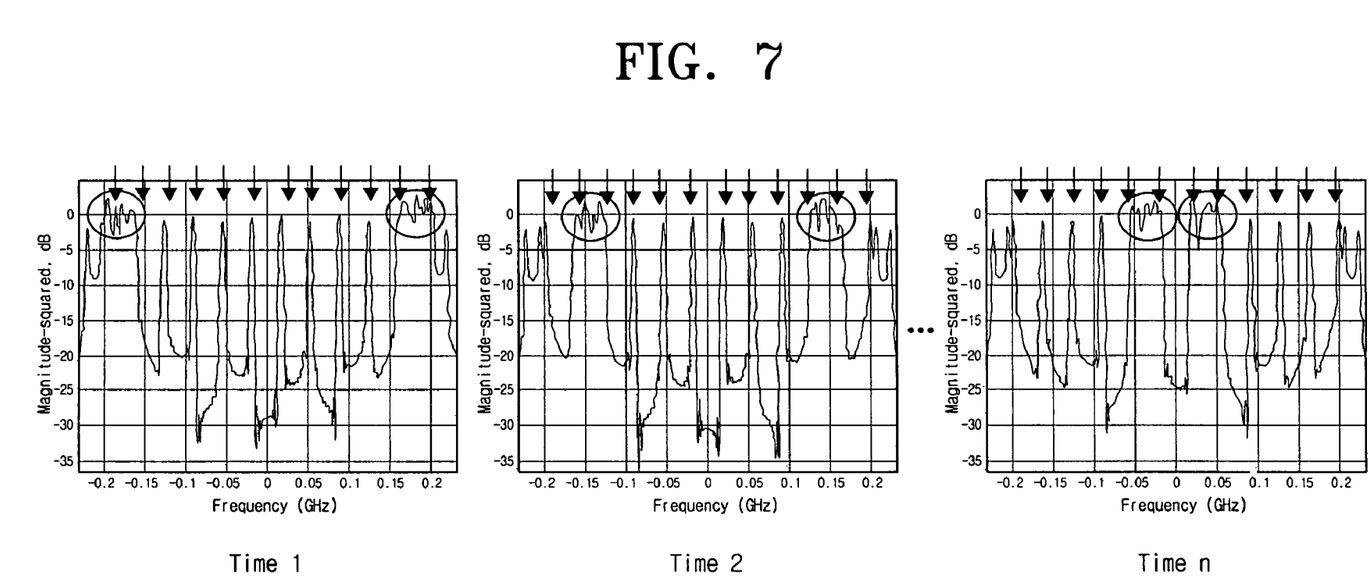
FIG. 7 illustrates a graph of frequency spectrums and power consumption for an OFDM symbol according to another exemplary embodiment of the present invention.

With reference to frequency spectrums of an OFDM symbol of FIG. 7 mapped as in this exemplary embodiment of the present invention, power is consumed only for sub-carriers grouped to predetermined sizes and pilots at uniform intervals in Time 1, Time 2, and Time n. Thus, even in a case where pilots are fixed and sub-carriers are grouped in block form, power consumption for the OFDM symbol can be more reduced than the continuous power consumption for the related art OFDM symbol as shown in FIG. 1B.

FIG. 5 is a view illustrating an OFDM symbol mapped as sub-carriers grouped in block form and moveable pilots in a method for hopping frequencies of the OFDM symbol according to still another exemplary embodiment of the present invention.

In this exemplary embodiment of the present invention, sub-carriers are grouped in block form so as to have a predetermined size, and pilots grouped to a predetermined size are moved at each time.

As shown in FIG. 5, a first sub-carrier group grouped in block form and pilots grouped to a predetermined size are transmitted in Time 1. A second sub-carrier group having hopped frequencies and grouped pilots of a predetermined size moved at more uniform intervals than the pilots transmitted in Time 1 are transmitted in Time 2. A fourth sub-carrier group having hopped frequencies and grouped pilots of a predetermined size moved at uniform intervals are transmitted in Time n.

Figure 8:
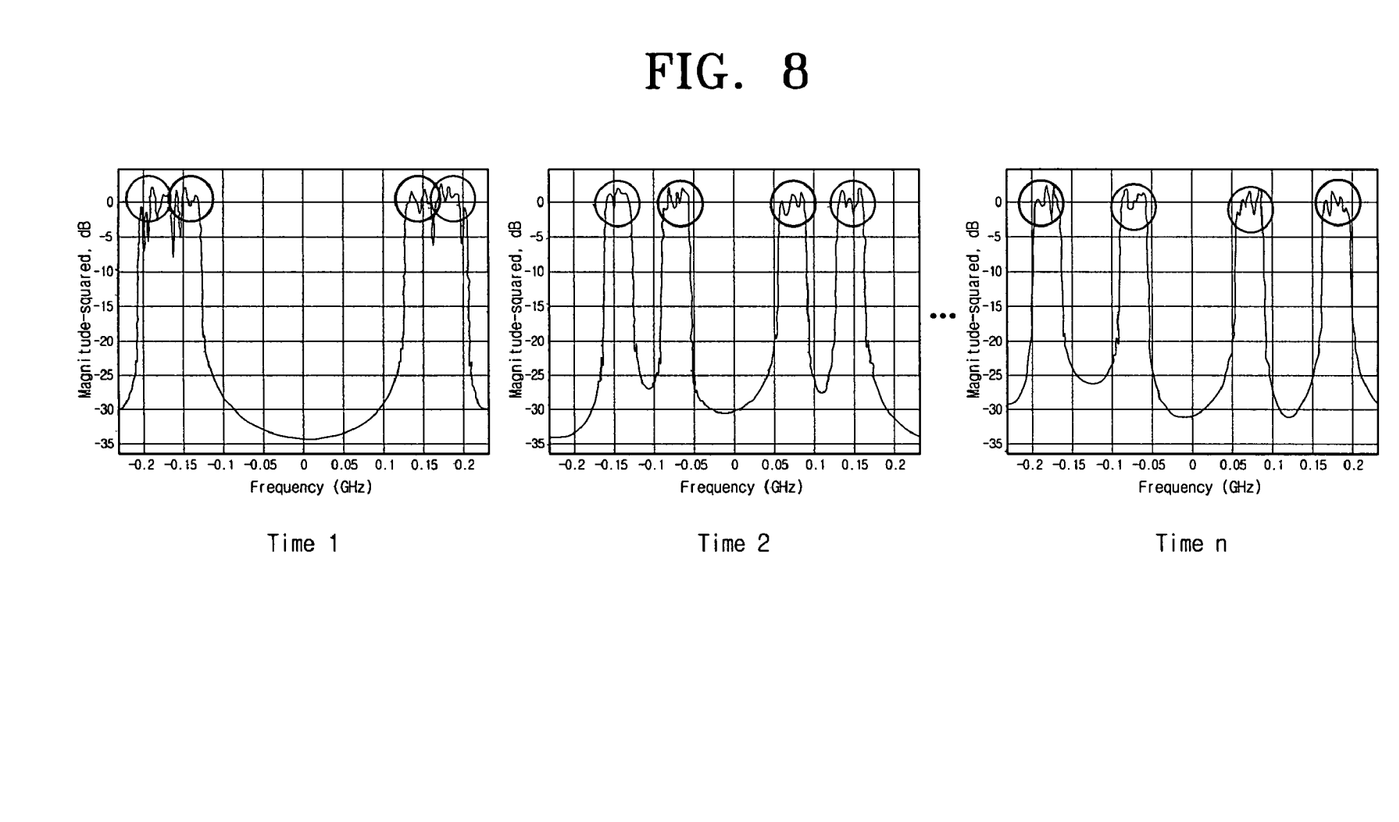
FIG. 8 illustrates a graph of frequency spectrums and power consumption for an OFDM symbol according to still another exemplary embodiment of the present invention.

With reference to frequency spectrums of an OFDM symbol of FIG. 8 mapped as in this exemplary embodiment of the present invention, power is consumed only for sub-carriers grouped to a predetermined size and pilots grouped to a predetermined size in Time 1, Time 2, and Time n.

Accordingly, even in a case where pilots are moved and sub-carriers are grouped in block form, power consumption of the OFDM symbol can be more reduced than the continuous power consumption for the related art OFDM symbol as shown in FIG. 1B. Also, when a plurality of piconets is formed due to a plurality of devices, information is transmitted over only some sub-carriers of an OFDM symbol. Thus, although a collision occurs in the OFDM symbol, a probability of information being damaged is reduced. As a result, a performance of a simultaneously operating piconet (SOP) capable of performing communications without interference can be improved.

As described above, according to the exemplary embodiments of the present invention, power consumption caused by a transmission of an OFDM symbol can be reduced. Also, a performance of an SOP can be improved.

In addition, a low power UWB modem can be realized. Thus, UWB technology can be applied to a mobile phone.

The foregoing embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for hopping frequencies of an orthogonal frequency division multiplexing (OFDM) symbol, comprising:

receiving a physical layer convergence procedure (PLCP) header for an OFDM symbol comprising mapping information about a pattern of disposing a plurality of sub-carriers of the OFDM symbol, a pattern of setting frequencies of the OFDM symbol, and locations of pilots in the OFDM symbol; and disposing the plurality of sub-carriers of the OFDM symbol in a frequency domain, setting the frequencies of the OFDM symbol at each time unit, and setting the locations of the pilots of the OFDM symbol in the frequency domain based on the mapping information, wherein the disposing the plurality of sub-carriers of the OFDM symbol comprises at least one of grouping the plurality of sub-carriers of the OFDM symbol into a plurality of groups in the frequency domain and distributing the plurality of sub-carriers of the OFDM symbol in the frequency domain, wherein the grouping the sub-carriers of the OFDM symbol into the plurality of groups comprises:

setting first sub-carriers grouped in a first sub-carrier group for transmission at a first time unit by an OFDM symbol transmitter; and setting second sub-carriers grouped in a second sub-carrier group for transmission at a second time unit by the OFDM symbol transmitter, wherein the setting the frequencies of the OFDM symbol at each time unit is performed by hopping the frequencies of the plurality of sub-carriers at each time unit, and wherein the first sub-carriers are set to use first frequencies for transmission by the OFDM symbol transmitter, and the second sub-carriers are set to use second frequencies, which are hopped from the first frequencies, for transmission by the OFDM symbol transmitter.

2. The method of claim 1, wherein the mapping information is set in reserved bits of a physical layer header of the PLCP header.

3. The method of claim 1, wherein the grouping the plurality of sub-carriers of the OFDM symbol is performed through combining a minimum of one sub-carrier to a maximum of a total number of the plurality of sub-carriers of the OFDM symbol.

4. The method of claim 1, wherein the grouping the plurality of sub-carriers of the OFDM symbol comprises overlapping the sub-carriers.

5. The method of claim 1, wherein, the distributing the plurality of sub-carriers of the OFDM symbol is performed by distributing the plurality of sub-carriers of the OFDM symbol at a same interval or at different intervals.

6. A method for hopping frequencies of an orthogonal frequency division multiplexing (OFDM) symbol, comprising:

receiving a physical layer convergence procedure (PLCP) header for an OFDM symbol comprising mapping information about a pattern of disposing a plurality of sub-carriers of the OFDM symbol, a pattern of setting frequencies of the OFDM symbol, and locations of pilots in the OFDM symbol; and disposing the plurality of sub-carriers of the OFDM symbol in a frequency domain, setting the frequencies of the OFDM symbol at each time unit, and setting the locations of the pilots of the OFDM symbol in the frequency domain based on the mapping information, wherein the pilots are moved to positions of sub-carriers in which a next OFDM symbol is to be transmitted, regardless of the pattern of disposing the plurality of sub-carriers, and wherein the pattern of disposing the plurality of sub-carriers comprises a pattern of distributing the plurality of sub-carriers and a pattern of grouping the plurality of sub-carriers.

7. The method of claim 1, wherein the setting the locations of the pilots of the OFDM symbol in the frequency domain is performed by at least one of distributing the pilots of the OFDM symbol in the frequency domain and grouping the pilots of the OFDM symbol into a plurality of groups in the frequency domain, and wherein the grouping the pilots of the OFDM symbol into the plurality of groups comprises:

setting first pilots grouped in a first pilot group for transmission at a first time unit by an OFDM symbol transmitter; and setting second pilots in a second pilot group for transmission at a second time unit by the OFDM symbol transmitter.

8. The method of claim 1, wherein the setting the locations of the pilots of the OFDM symbol is performed by disposing the pilots of the OFDM symbol at locations with reference to locations of the plurality of sub-carriers according to a request from a receiver of the OFDM symbol.

9. A method for hopping frequencies of an orthogonal frequency division multiplexing (OFDM) symbol, comprising:

receiving a physical layer convergence procedure (PLCP) header for an OFDM symbol comprising mapping information about a pattern of disposing a plurality of sub-carriers of the OFDM symbol, a pattern of setting frequencies of the OFDM symbol, and locations of pilots in the OFDM symbol; and disposing the plurality of sub-carriers of the OFDM symbol in a frequency domain, setting the frequencies of the OFDM symbol at each time unit, and setting the locations of the pilots of the OFDM symbol in the frequency domain based on the mapping information, wherein the pattern of setting the frequencies of the OFDM symbol is provided such that the plurality of sub-carriers have fixed frequencies in the OFDM symbol, or the frequencies of the plurality of sub-carriers are hopped, regardless of the pattern of disposing the plurality of sub-carriers, and wherein the pattern of disposing the plurality of sub-carriers comprises a pattern of distributing the plurality of sub-carriers and a pattern of grouping the plurality of sub-carriers.

10. The method of claim 9, wherein a number of patterns of the hopping frequencies is "$n^{n-1}$", if the plurality of sub-carriers are grouped to an identical size without overlapping with one another and when a number of grouped sub-carriers is "n".

11. The method of claim 10, wherein the hopping frequencies is performed in consideration of a symmetric characteristic when the plurality of sub-carriers are in frequency domain spreading.

12. The method of claim 9, wherein a number of the hopping frequencies is "$m^{m-1}$", if the plurality of sub-carriers overlap with one another, or are grouped to different sizes, and a number of grouped sub-carriers is "m".

13. The method of claim 9, wherein the hopping frequencies is performed maintaining a same interval or different intervals.

14. The method of claim 13, wherein the plurality of sub-carriers are overlapped if the hopping frequencies is performed at the same interval or at the different intervals.

15. The method of claim 13, wherein the plurality of sub-carriers are not overlapped when the hopping frequencies is performed at the same interval or at the different intervals.

16. The method of claim 1, wherein the setting the locations of the pilots of the OFDM symbol in the frequency domain is performed by at least one of distributing the pilots of the OFDM symbol in the frequency domain and grouping the pilots of the OFDM symbol into a plurality of groups in the frequency domain, and wherein the grouping the pilots of the OFDM symbol into the plurality of groups comprises:

setting first pilots grouped in a first pilot group for transmission at the first time unit by an OFDM symbol transmitter; and setting second pilots in a second pilot group for transmission at the second time unit by the OFDM symbol transmitter.

17. An orthogonal frequency division multiplexing (OFDM) symbol transmitter comprising:

a receiver which receives a physical layer convergence procedure (PLCP) header for an OFDM symbol comprising mapping information about a pattern of disposing a plurality of sub-carriers of the OFDM symbol, a pattern of setting frequencies of the OFDM symbol, and locations of pilots in the OFDM symbol; and a constellation mapper which performs:
- at least one of grouping the plurality of sub-carriers of the OFDM symbol into a plurality of groups in the frequency domain and distributing the plurality of sub-carriers of the OFDM symbol in the frequency domain;
- sets the frequencies of the OFDM symbol at each time unit; and
- sets the locations of the pilots of the OFDM symbol in the frequency domain based on the mapping information, wherein, by the grouping the sub-carriers of the OFDM symbol into the plurality of groups, the constellation mapper sets first sub-carriers grouped in a first sub-carrier group for transmission at a first time unit by an OFDM symbol transmitter, and sets second sub-carriers grouped in a second sub-carrier group for transmission at a second time unit by the OFDM symbol transmitter, wherein the setting the frequencies of the OFDM symbol at each time unit is performed by hopping the frequencies of the plurality of sub-carriers at each time unit, and wherein the constellation mapper sets the first sub-carriers to use first frequencies for transmission by the OFDM symbol transmitter, and sets the second sub-carriers to use second frequencies, which are hopped from the first frequencies, for transmission by the OFDM symbol transmitter.

18. The OFDM symbol transmitter of claim 17, wherein the setting the frequencies of the OFDM symbol at each time unit is performed by hopping the frequencies of the plurality of sub-carriers at each time unit, and wherein the constellation mapper sets the first sub-carriers to use first frequencies for transmission by the OFDM symbol transmitter, and sets the second sub-carriers to use second frequencies, which are hopped from the first frequencies, for transmission by the OFDM symbol transmitter.

* * * * *